Jan. 4, 1927. 1,612,973
E. H. GOLD
FLEXIBLE PIPE CONNECTION
Filed Oct. 11, 1924 2 Sheets-Sheet 2

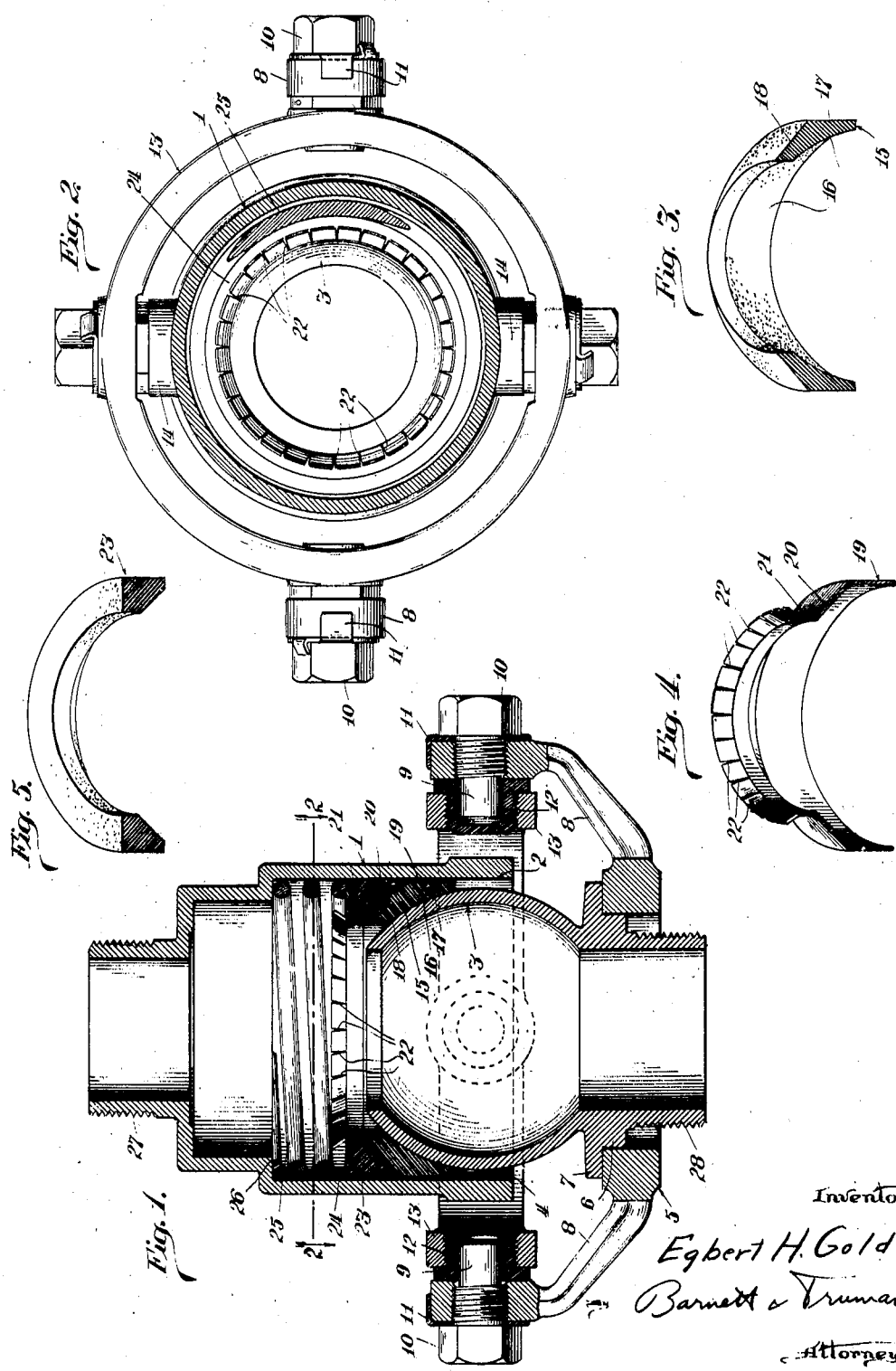

Inventor
Egbert H. Gold
By Barnett & Truman
Attorneys

Patented Jan. 4, 1927.

1,612,973

UNITED STATES PATENT OFFICE.

EGBERT H. GOLD, OF CHICAGO, ILLINOIS.

FLEXIBLE PIPE CONNECTION.

Application filed October 11, 1924. Serial No. 743,091.

My invention relates to a flexible pipe joint of the type comprising a socket member and a ball member arranged within and spaced slightly from the wall of the socket member, and the object of the invention is to provide an improved follow-up gasket or packing adapted to be interposed between the socket member and the inner end of the ball member and to be forced against said members by a spring or fluid pressure, or both, to maintain the joint fluid tight, the gasket being adapted to move forwardly or follow up as it wears so that the seal will remain effective even with continued wear of the gasket.

The invention is intended particularly for use as part of a flexible pipe joint between the steam pipes of adjacent cars of a railway train. Such a pipe connection must be freely flexible to allow for the relative angular movements of the two cars, and at the same time must maintain a fluid-tight joint. There are constant vibratory movements between the two members of the joint which tend to wear down the gasket, particularly the surface thereof bearing against the ball. The fluid pressure in the joint tends to force the gasket as a wedge, into the space between the ball and socket so that wear is taken up automatically. Moreover, the heat of the steam tends to harden or vulcanize the necessarily thin outer edge of the gasket so that this being impaired the gasket must be in other respects formed or constructed so as to maintain the desired seal.

My present invention seeks to provide a gasket for use in a joint of this type and in the position mentioned which will accomplish its sealing function more satisfactorily and will be more durable than gaskets heretofore employed in this connection.

Other objects and advantages of the invention will be apparent from the following detailed description of two approved forms of the apparatus, the second being regarded as preferable for reasons principally of economy.

In the accompanying drawings

Fig. 1 is a central longitudinal section through the flexible joint.

Fig. 2 is a transverse section taken substantially on the line 2—2 of Fig. 1.

Fig. 3 is a sectional perspective view through the inner gasket.

Fig. 4 is a similar view through the follower.

Fig. 5 is a similar view through the sealing ring.

Figure 6:
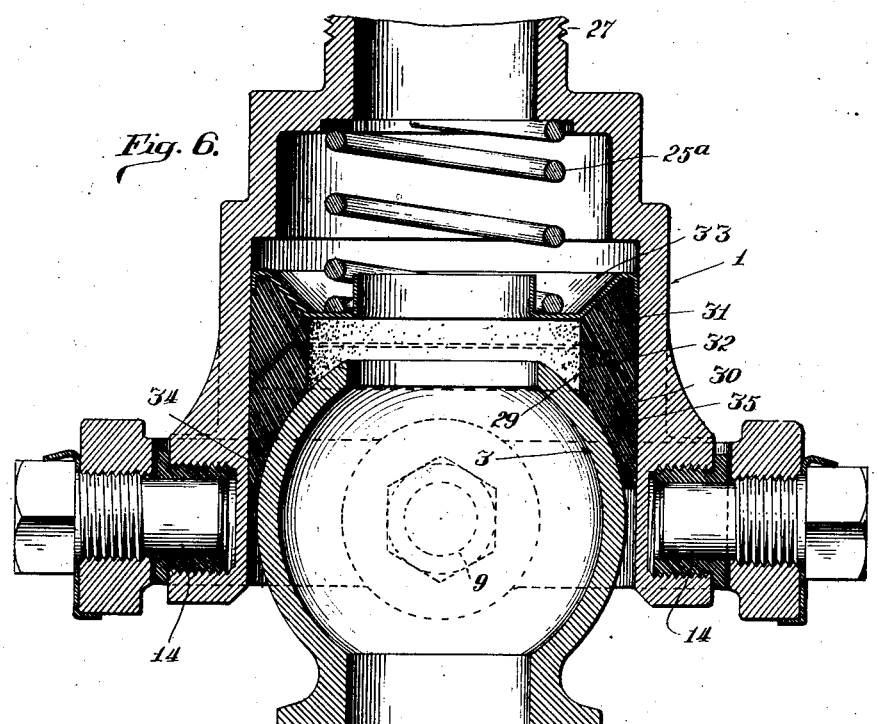
Fig. 6 is a longitudinal sectional view of a flexible joint provided with another and preferred form of gasket in accordance with my invention.

The flexible pipe joint comprises a socket member 1 having a cylindrical recess or opening 2 therein, and a ball member 3 centered within the outer portion of recess 2 and having a loose working fit therein so that preferably a substantial clearance 4 exists between all portions of the ball and the surrounding socket member. Positive means are provided for articulating the ball member 3 within socket member 1 in such manner as to permit free angular and preferably also rotative movements of the ball within the socket. For this purpose an annular collar 5 is swiveled upon a neck portion 6 of the ball member 3 behind a shoulder 7 projecting outwardly from the neck portion. Arms 8 extending outwardly at diametrically opposite points from the collar 5, project forwardly around the ball member 3. Pivot studs 9, at the ends of bolts 10, are screwed into the outer ends of arms 8, the studs 9 having a common center line extending through the center of ball 3. Suitable nut locks 11 maintain the pivot studs in place in the arms 8. Studs 9 are pivoted in bushings 12, of bronze or other suitable bearing metal, screwed into the ring member 13 which loosely surrounds the outer end of socket member 1. The ring 13 is similarly pivoted to diametrically opposite studs 14 projecting from socket member 1, on an axis also passing through the center of ball 3 and at right angles to the axes of the studs 9, first described. The mechanism just described positively holds the ball 3 centered within the socket member 1, but permits the ball member to have a universal angular movement, within certain limits, and also allows the ball member to freely rotate within the collar 5.

The gasket about to be described, which forms the particular subject matter of this invention, is designed to maintain a fluid-tight joint between the ball 3 and socket 1 without interfering with free angular or rotary movement between these parts.

Referring first to Figs. 1 to 5 which show the invention in one embodiment, the outer gasket member or packing ring 15, formed of a suitable hard composition adapted to resist wear, has a curved surface 16 adapted to fit against the outer surface of ball 3. This member has an outer cylindrical surface 17 of somewhat smaller diameter than the inner surface of recess 2. The rear portion of member 15 has a conical surface 18. A metallic follower or ferrule, preferably made of brass or other thin sheet metal, surrounds the inner member 15. This follower has an outer cylindrical portion 19 snugly enclosing the cylindrical portion 17 of gasket 15, and fitting as closely as may be within the recess 2 of socket member 1. Extending from cylindrical portion 19 is a conical deflecting portion 20 snugly enclosing the conical rear portion of member 15. Extending from the inner end of conical portion 20 is a smaller cylindrical portion 21 having an annular series of longitudinal slits. An inner gasket member or sealing ring 23, preferably of soft rubber or other suitable soft composition, is so shaped, as shown in Fig. 5, as to snugly fit the recess formed between cylindrical portion 21 and conical deflecting portion 20 of the follower and the surrounding wall of recess 2 in the socket member. A flat metallic follow-up washer 24 encloses and bears against the end of member 23.

After the packing ring 15, follower 20, sealing ring 23 and washer 24 have been assembled, as shown in Fig. 1 (which is done before the gasket assembly is inserted within the socket member), the slit inner portion 22 of the follower is bent outwardly, as indicated in Figs. 1 and 4, to hold the members in assembled relation. Before positioning this sealing assembly within the packing member, a compression spring 25 is inserted into the inner portion of recess 2, this spring being adapted to bear at one end against a shoulder 26 in the socket member 1, and at the other end against the washer 24.

Threaded tubular extensions 27 and 28 on the socket and ball members, respectively, are adapted for connection with the adjacent sections of the flexible pipe or conduit.

When the various parts have been assembled, as shown in Fig. 1, and the pipe connection is in operation, the fluid pressure existing within the pipe will force the gasket tightly into the space between the inner end of ball 3 and the surrounding portion of socket member 1. The curved face 16 of gasket member 15 will be held tightly against the outer surface of ball 3 so as to prevent the escape of fluid at this place. The greater portion of the movement between the members takes place between this gasket 15 and ball 3, and the hard composition of which the gasket is composed is adapted to resist to a considerable extent the wear caused by this movement. However, as wear of the gasket member 15 takes place the gasket as a unit will be forced further into the space between the ball and socket by the fluid pressure existing within the pipe connection, assisted by the spring 25. Spring 25 will hold the gasket in place when the fluid pressure within the conduit disappears. At all times the outer soft gasket member 23 will be wedged tightly into the tapering recess between the follower and the socket member by the fluid pressure and the spring 25 acting against the washer 24. The member 23 will, therefore, always maintain an absolutely fluid tight joint between the gasket and the inner walls of socket 1.

Figure 7:
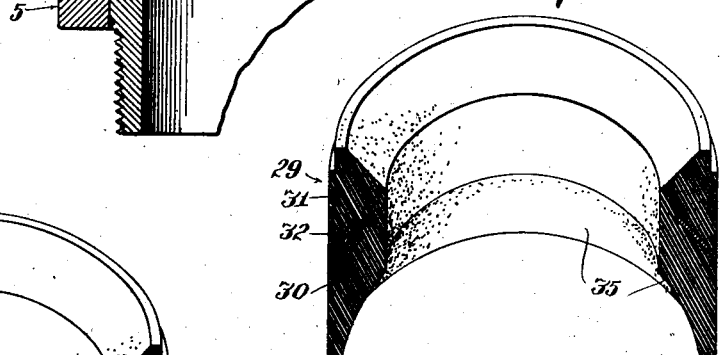
Fig. 7 is a fragmentary sectional perspective of the gasket shown in Fig. 6.

In Figs. 6 and 7 I have shown an embodiment of the invention which I consider preferable to the embodiment illustrated in Figs. 1 to 5 inclusive, particularly because it is simpler and cheaper to make. In the form of the invention shown in Figs. 6 and 7 the inner and outer gasket members, instead of being made separately and one of hard and the other of softer material, are made in one piece and of one material, the material being preferably of ordinary rubber composition used for gaskets in steam hose or pipe connections.

Referring to the drawings, the gasket, designated 29 as a unit, is divided into outer and inner members 30, 31 by a metallic ring 32 which is preferably conical and inclined outwardly and in the direction of the open end socket. The body of the gasket may be molded about this ring. On the inner end of the gasket is arranged a follower plate 33 for the spring 25ª. While the portions 30, 31 of the gasket 29 form an integral structure, they act, in a sense, as separate members accomplishing much the same purpose accomplished by making the gasket in two pieces, as shown in Figs. 1 to 5. The heat of the steam softens the body of the gasket considerably and the follow-up pressure of the fluid and spring 25ª acts to force the upper member 31 of the gasket into the wedge-like annular space between the wall of the socket member 1 and ring 32. The fact that the material of the gasket adheres to the ring does not prevent this action when the material of the gasket has become softened through heat. Therefore, member 31 of the gasket, by expanding outwardly, that is radially of the gasket, provides an effective seal as between the gasket and the socket. The necessarily thin, tapered outer end 34 of the gasket is hardly effective for insuring a proper seal either between the gasket and the socket or the socket and the ball. This portion of the gasket becomes hardened or vulcanized through constant heat and is likely to be frayed, broken or worn by dirt or cinders which may work in between the ball and the socket. It is the inner portion of surface 35 of the gasket which provides the effective seal; and the crowding outwardly of the inner portion of the gasket, which we have termed "inner member", produces a thrust on the ring 32 which tends to force the inner member 30 of the gasket against the ball 3. The conical ring 32, therefore, divides the gasket body into two functionally separate though structurally united wedging members, one of which is thrust toward the socket so as to affect a seal at this place, while the other is thrust against the ball so as to seal the joint at this surface, these operations being made possible, or at least being accentuated, by the softened and plastic condition of the gasket body when subjected to heat. The material of the gasket consists ordinarily of compositions of vulcanized rubber and asbestos, the commonly used material being known as "Jenkins" material.

The unitary gasket of Figs. 6 and 7 operates generally, therefore, the same as the two-part gasket of Figs. 1 to 5.

Figure 8:
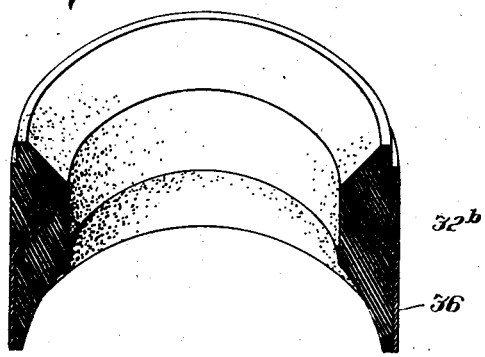
Fig. 8 is a view like that of Fig. 7 showing a different form of gasket.

In Fig. 8 I have shown the conical ring 32<sup>b</sup> as provided with a cylindrical extension 36 which provides an armoring for the lower gasket member. It may be desirable to use this armoring under certain circumstances.

I claim:

1. In a flexible pipe connection, the combination of a cylindrical socket, a ball therein and articulated therewith, and a gasket comprising members having bearing surfaces against said socket and the inner end of the ball, respectively, one positioned inwardly, with respect to the length of the connection, in relation to the other, and a substantially rigid element interposed between said members having a surface oblique to the longitudinal axis of the gasket whereby longitudinal thrust against the gasket causes said members to be forced one radially against the socket and the other longitudinally against the ball.

2. In a flexible pipe connection, the combination of a cylindrical socket, a ball therein and articulated therewith, and a gasket comprising members having bearing surfaces against said socket and the inner end of the ball, respectively, one positioned inwardly, with respect to the length of the connection, in relation to the other, and a substantially rigid conical element interposed between said members whereby longitudinal thrust against the gasket causes said members to be forced one radially against the socket and the other longitudinally against the ball.

3. In a flexible connection for steam train pipes, the combination of a cylindrical socket, a ball therein and articulated therewith, and a gasket comprising an integral body of material relatively soft at steam temperatures, and a substantially rigid element obliquely arranged with respect to the longitudinal axis of the gasket dividing said body into two members and embedded therein so that with a longitudinal thrust on the gasket one member of said body is forced radially against the socket and the other longitudinally against the inner end of the ball.

4. In a flexible connection for steam train pipes, the combination of a cylindrical socket, a ball therein and articulated therewith, and a gasket comprising an integral body of material relatively soft at steam temperatures, and a substantially rigid, conical element having substantially parallel inner and outer conical surfaces dividing said body into two members and embedded therein so that with a longitudinal thrust on the gasket one member of said body is forced radially against the socket and the other longitudinally against the ball.

5. In a flexible pipe connection, a cylindrical socket, a ball therein and articulated therewith, and a gasket slidable in said socket and against the ball, comprising a body of material resilient under service conditions and a substantially rigid element embedded therein and extending from the outer surface thereof inwardly of the joint and away from the open end of the socket to a place near but short of the inner surface of said body.

6. In a flexible pipe connection, a cylindrical socket, a ball therein and articulated therewith, and a gasket comprising a body of rubber composition having embedded therein a metal conical ring arranged obliquely with respect to the axis of the gasket between the ends thereof.

7. In a flexible pipe connection, a cylindrical socket, a ball therein and articulated therewith, and a gasket comprising a body of rubber composition having embedded therein a metal conical ring extending from the outer surface of the gasket to a place near the inner surface and in a direction away from the open end of the socket.

8. In a flexible pipe connection, the combination of ball and socket members, and a gasket comprising outer and inner members of rubber composition, the former intervening between the inner end of the ball and the socket and the latter extending inwardly beyond the ball along the socket, and a rigid element separating said members and extending obliquely with respect to the longitudinal axis of the gasket.

9. In a flexible pipe connection, the combination of ball and socket members, and a gasket comprising outer and inner members of rubber composition, the former intervening between the inner end of the ball and the socket and the latter extending inwardly beyond the ball along the socket, and a rigid, conical element separating said members.

10. In a flexible pipe connection, the combination with a ball and a socket of a gasket slidable in the socket inwardly of the ball comprising an outer member of resilient material, the inner end of which is formed to provide a wedge-shaped space between said member and the socket, and an inner member of resilient material, the outer end of which is wedge-shaped and lies in said wedge-shaped space, whereby longitudinal pressure on the gasket in an outward direction forces the inner member radially against the socket and the outer member against the ball.

11. In a flexible pipe connection, the combination of an interiorly cylindrical socket, a ball positioned within the socket, and a gasket between the ball and socket comprising a body of rubber composition having a substantially cylindrical outer surface, and a conical ring having substantially parallel inner and outer conical surfaces embedded in said body and disposed obliquely with respect to said outer surface and extending to said surface.

12. In a flexible pipe connection, the combination of an interiorly cylindrical socket, a ball positioned within the socket, and a gasket between the ball and socket comprising a body of rubber composition having a substantially cylindrical outer surface, and a conical ring embedded in said body and disposed obliquely with respect to said outer surface and extending to said surface with its other edge within the inner surface of the gasket.

13. In a flexible pipe connection, the combination of an interiorly cylindrical socket, a ball positioned within the socket, and a gasket between the ball and socket comprising a body of rubber composition having a substantially cylindrical outer surface and a curved inner surface at one end of the gasket, and a conical ring embedded in said body at a place substantially intermediate the ends of the gasket and arranged obliquely with respect to the axis of the gasket.

14. In a flexible pipe connection, the combination of an interiorly cylindrical socket, a ball positioned within the socket, and a gasket between the ball and socket comprising a body of rubber composition having a substantially cylindrical outer surface, a curved inner surface at one end of the gasket and a beveled inner surface at the other end thereof, and a conical ring embedded in said body at a place substantially intermediate the ends of the gasket and arranged obliquely with respect to the axis of the gasket.

15. In a flexible pipe connection, the combination of an interiorly cylindrical socket, a ball positioned within the socket, and a gasket between the ball and socket comprising two annular members of rubber composition having substantially the same outside diameter and formed to have wedging relation one with the other, and a metal conical ring interposed between said members.

16. In a flexible pipe connection the combination of a ball, an interiorly cylindrical socket, and a gasket intervening between the socket and the inner portion of the ball comprising annular members of rubber composition having surfaces bearing on the cylindrical surface of the socket and formed to have wedging relation one with the other, and a conical metal ring interposed between said members.

17. In a flexible pipe connection the combination of a ball, an interiorly cylindrical socket, and a gasket intervening between the socket and the inner portion of the ball comprising annular members of rubber composition having surfaces bearing on the cylindrical surface of the socket and formed to have wedging relation one with the other, and a conical metal ring interposed between said members, the outer one of said members formed with a curved surface to fit said ball.

18. In a flexible pipe connection the combination of a ball, an interiorly cylindrical socket, and a gasket intervening between the socket and the inner portion of the ball comprising annular members of rubber composition having surfaces bearing on the cylindrical surface of the socket and formed to have wedging relation one with the other, and a conical metal ring interposed between said members, the outer one of said members formed with a curved surface to fit said ball, and the other with an interior beveled surface, a conical follow-up plate to bear against said beveled surface and a spring bearing against said plate.

19. A flexible connection, comprising a socket having a substantially cylindrical recess, a ball projecting within said recess but not in contact with the wall thereof, connecting means between the ball and socket preventing disengagement but allowing universal relative angular movements thereof, and a gasket slidable in the cylindrical recess comprising a member having a curved outer face to bear against the ball and a conical inner face providing a wedge-shaped space between said face and the inner surface of the socket, and a member arranged inwardly of said first named member and formed with a wedge-shaped portion extending into said wedge-shaped space.

20. A flexible pipe connection comprising a socket having a substantially cylindrical recess, a ball projecting within said recess but not in contact with the wall thereof, connecting means between the ball and socket preventing disengagement but allowing universal relative angular movements thereof, and a gasket slidable in the cylindrical recess comprising a member having a curved outer face to bear against the ball and a conical inner face, a conical ring in contact with said conical inner face, and a member wedge-shaped and in wedging position between the socket and the ring.

21. In combination with a joint comprising a ball and an internally cylindrical socket, a gasket formed to fit between the inner end of the ball and the socket comprising inner and outer annular members both of rubber composition and having cooperating wedge faces arranged so that longitudinal pressure on the gasket compresses the outer member against the ball and expands the inner member against the socket.

22. In combination with a joint comprising a ball and an internally cylindrical socket, a gasket composed of rubber composition and formed to fit between the inner end of the ball and the socket comprising cooperating inner and outer annular wedge members arranged so that longitudinal pressure on the gasket compresses the outer member against the ball and expands the inner member against the socket, and a conical metal element intervening between said members.

EGBERT H. GOLD.